United States Patent [19]

Nowak et al.

[11] Patent Number: 4,931,095

[45] Date of Patent: Jun. 5, 1990

[54] BENZOATE INKS

[75] Inventors: Michael T. Nowak, Gardner, Mass.; Michael L. Demers, Nashua, N.H.

[73] Assignee: Howtek, Inc., Hudson, N.H.

[21] Appl. No.: 272,020

[22] Filed: Nov. 15, 1988

[51] Int. Cl.$^5$ .............................................. C09D 11/00
[52] U.S. Cl. ...................................... 106/22; 106/26; 106/31; 524/311
[58] Field of Search ............................ 106/22, 26, 31

[56] References Cited

U.S. PATENT DOCUMENTS

| | | | |
|---|---|---|---|
| 4,380,518 | 4/1983 | Wydro | 264/13 |
| 4,426,227 | 1/1984 | Keeling et al. | |
| 4,583,104 | 4/1986 | Iwakura et al. | |
| 4,585,483 | 4/1986 | Ikeda et al. | |
| 4,628,000 | 12/1986 | Talvalkar et al. | |
| 4,684,956 | 8/1987 | Ball | 106/22 |
| 4,692,188 | 9/1987 | Ober et al. | |
| 4,756,950 | 7/1988 | Matsushita | 428/480 |

FOREIGN PATENT DOCUMENTS

| | | | |
|---|---|---|---|
| 53-98770 | 8/1978 | Japan | . |
| 55-25463 | 2/1980 | Japan | . |

*Primary Examiner*—Theodore Morris
*Attorney, Agent, or Firm*—Nutter, McClennen & Fish

[57] ABSTRACT

An ink for hot-melt ink-jet printing comprising a benzoate solvent which is solid at room temperature. This ink is suitable for jetting onto an opaque substrate such as paper for directly readable print, or onto a transparent substrate, such as an acetate or polycarbonate sheet, to make a projectable transparency.

11 Claims, No Drawings

BENZOATE INKS

BACKGROUND OF THE INVENTION

A. Field of the Invention

This invention relates to printing inks comprising a solid organic solvent for hot-melt ink-jet printers, and, more particularly, to such inks in which the solid organic solvent comprises one or more benzoate compounds.

B. Prior Art

Inks that are to be utilized in document printing by ink-jet application are subject to demanding and frequently conflicting requirements. Such inks are commonly used to print on opaque substrates, such as paper, in which case the printing must be sharp and clean for direct reading. Colored inks for such uses must contrast well with the substrate to form a distinct image.

Further, on a fibrous material (e.g. paper), the ink must not soak in and spread or "bleed" excessively, lest the sharpness of the image be unacceptably reduced. As an example of the degree of sharpness necessary, current applications require a resolution on the order of 240×400 (i.e. 240 dots per inch in the horizontal direction, and 400 dots per inch in the vertical direction) for text printing. High quality graphics printing may require resolutions extending up to 600 dots per inch. Also, the print must be resistant to abrasion, as well as to inadvertant transfer to adjacent materials. Additionally, since the document may be exposed to a variety of climates, the print should remain stable at temperatures ranging from −20° C. to +70° C. These restrictions are fairly severe when applied to black ink, but are even more severe when applied to colored inks, since even minor changes in color are frequently noticeable.

Different requirements are imposed if the ink must print on transparent materials for forming, for example, overhead projection transparencies. For projectable transparencies, the image must not only be sharp, but, in the case of colored inks, transparent as well. Such colored inks must produce an image which is highly transparent in order for the color quality to be retained when projected on a screen.

In the case of inks that are to be applied by hot-melt ink jet techniques, the problem is even further compounded by the necessity that the inks be compatible with jetting requirements of the printer. Typically, this application imposes restrictions on, for example, the viscosity of the inks, so that the inks can be expelled from the jet as relatively uniform droplets without excessive "satelliting", i.e. fragmentation of the ink droplet which results from improper jetting. Furthermore, the inks must be stable at operating temperatures as high as 150° C. or even 175° C. Additionally, the constituents must all be compatible with each other, both physically (i.e. capable of forming a solution which can be jetted successfully) and chemically (i.e. not adversely affecting the stability or other characteristics of the materials).

Many inks heretofore utilized in ink jet printers have been aqueous solutions of water-soluble dyes. Examples of such inks are described in U.S. Pat. No. 3,846,141, issued Nov. 5, 1974 to D. G. Ostergren et al, and U.S. Pat. No. 4,512,807 issued Apr. 23, 1985 to A. Ogawa et al. Inks of this type have been found acceptable for many applications, but do not produce the desired hardness in the resultant print, nor the requisite stability and sharpness for fine color applications.

An example of a non-aqueous ink jet ink is described in U.S. Pat. No. 4,390,369, issued June 28, 1983 to A. R. Merritt et al. The ink described therein utilizes a natural wax which is liquefied by heating in order to jet it and which is thereafter solidified on contact with the substrate, e.g. paper. Among other drawbacks, however, the resultant material readily abrades and is thus unacceptable for most document purposes where some degree of print stability is required.

Various benzoate compounds have been used in recording materials and printing compositions because of their desirable melting points and heat stability. U.S. Pat. No. 4,583,104, issued Apr. 15, 1986 to Iwakura et al. and U.S. Pat. No. 4,585,483, issued Apr. 29, 1986 to Ikeda et al., both describe the use of selected benzoates as "thermofusible substances" for use in heat sensitive recording materials. U.S. Pat. No. 4,426,227, issued Jan. 15, 1986 to Keeling et al. discloses a printing medium comprising a thermoplastic resin and a "rheology controlling diluent". The diluent is selected from a group of materials including "high molecular weight esters", among which are listed neopentyl glycol dibenzoate and triethylene glycol dibenzoate. U.S. Pat. No. 4,628,000, issued Dec. 9, 1986 to Talvalkar et al. describes a thermal-sensitive ink formulation for use in thermal printing comprising a mixture of sucrose benzoate and other components. None of these references describes or discusses any formulations for use as hot-melt ink-jet ink.

SUMMARY OF THE INVENTION

A. Objects of the Invention

Accordingly, it is an object of the present invention to provide an improved ink for hot-melt ink-jet printers that is suitable for use on both opaque and transparent substrates.

Another object is to provide such an ink which possesses good jetting characteristics and which is chemically and physically stable at high operating temperatures.

Another object is to provide a method of printing colored images on opaque substrates for direct viewing, and on transparent substrates for projected viewing.

A further object of the present invention is to provide a transparency made by hot-melt ink jet printing suitable for projected viewing.

B. Brief Summary of the Invention

In accordance with the present invention, inks are provided which are capable of printing on either opaque or transparent substrates with acceptable print quality. The ink comprises at least one solid organic solvent which includes one or more benzoate groups within its molecular structure (e.g. bonded as an ester), with the solid solvent preferably having a melting point of less than about 175° C., and more preferably less than about 150° C. Particularly good results are obtained with pentaerythritol tetrabenzoate as the solvent, alone or in combination with other benzoate esters. The mixture may further comprise a relatively small amount (on the order of about 2 percent by weight or less) of a temperature-stable dye. In a preferred embodiment of the invention, subtractive color dyes are provided for multi color printing usage. Additional ingredients, such as antioxidant stabilizers, may also be included. This ink is suitable for use on opaque substrates, such as ordinary paper, or on transparency films, which are generally made from materials such as polyester,

DETAILED DESCRIPTION OF THE INVENTION

The inks of the present invention comprise an organic solvent which is generally solid at room temperature but molten at the operating temperature of a hot-melt ink jet printer. The solid solvent comprises one or more benzoate derivatives, preferably selected such that the solid solvent has a melting point below 175° C., and more preferably below 150° C. However, higher melting point solvents could be used in correspondingly higher operating temperature printers.

The inks may be applied to a substrate by conventional hot-melt ink-jet processes. When applied to a transparency substrate, the printed surface is preferably further coated or laminated with a clear material to protect the print.

The benzoate esters of the present invention can be formed by the reaction of benzoic acid and an alcohol. A preferred class of benzoates are the reaction products of polyhydroxyl alcohols ("polyalcohols") with a molar equivalent, by hydroxyl content, of benzoic acid. Particularly good results have been obtained with benzoates which can be derived from the polyalcohols pentaerythritol, sucrose, glycerol or neopentyl glycol. One mole of pentaerythritol can react with four moles of benzoic acid to form one mole of pentaerythritol tetrabenzoate. Similarly, one mole of sucrose can react with approximately seven moles of benzoic acid to form one mole of sucrose benzoate; one mole of glycerol can react with three moles of benzoic acid to form one mole of glyceryl tribenzoate; and one mole of neopentyl glycol can react with two moles of benzoic acid to form one mole of neopentyl glycol dibenzoate.

When pentaerythritol tetrabenzoate is used as the principal component of the solvent, it is desirable to include other components to modify the physical properties of the ink, including toughness and flexibility on paper and viscosity of the ink at jetting temperatures. A preferred formulation for the ink of the present invention comprises a bulk vehicle that is 75-90 weight percent (wt %) pentaerythritol tetrabenzoate and 25-10 wt % physical property modifiers, the latter controlling such characteristics as viscosity, surface tension and flow properties. To the bulk vehicle are added dyes, preservatives and other selected ink additives as are well known in the art. Good results were obtained with a composition comprising 75-90 wt % pentaerythritol tetrabenzoate and 25-10 wt % polymethylstyrene, with up to 1 wt % antioxidant, and 0.25-1.25 wt % dye. Good results were also obtained with 75-90 wt % pentaerythritol tetrabenzoate, 25-5 wt % sucrose benzoate and up to 5 wt % glyceryl tribenzoate, with up to 1 wt % antioxidant and 0.25-1.25 wt % dye. Furthermore, it has been found that increasing the dye content to approximately 2 wt % is desirable for transparency applications; the additional dye provides richer color upon projection (e.g. onto a screen).

The pentaerythritol tetrabenzoate used in the following examples was manufactured by the Velsicol Chemical Corporation, and sold under the trademark Benzoflex S-552. It is characterized as a crystalline solid which melts at about 98° C. to 101° C. The sucrose benzoate and the glyceryl tribenzoate were also manufactured by Velsicol Chemical, with the glyceryl tribenzoate being sold under the trademark Benzoflex S-404. The polymethylstyrene was manufactured by Hercules, Inc., and sold under the trademark Kristalex 3085. The antioxidant which was used was Ultranox 626, made by Borg-Warner Chemicals, Inc.

The dyes used in these inks can be any suitable commercially available dyes, provided they are chemically compatible with the solvent material. For color printing, it is preferred to use subtractive color dyes which can then be combined by multiple spot jetting to form any desired color. Various dyes were used in combination with these ink formulations, with good results being obtained with inks containing one dye from the following: Neopren Black X-53 (BASF), Atlasol Black M (Atlantic Industries), Zapon Yellow 073 (BASF), Sandoplast Red 2B (Sandoz Chemicals), and Orasol Blue GN (Ciba-Geigy).

Preferably, the hot-melt inks of the present invention should have viscosities within the range of about 5 to 30 centipoise at jetting temperatures, and should jet without significant satelliting. The inks should not clog the jets when left in them for extended periods of time at the jetting temperature, and should remain stable in the jet printer at operating temperatures up to 150° C., or even to 175° C.

EXAMPLE I

An ink composition was made as follows:

| An ink composition was made as follows: | |
|---|---|
| | parts by weight |
| Pentaerythritol tetrabenzoate | 75 |
| Sucrose benzoate | 25 |
| Atlasol Black M | 1 |

These inks were all found to jet well, and to form sharp, tough, strongly-adherent print on both paper and clear acetate sheets. On the acetate sheets, the printed images made with the colored inks were fully transparent and showed distinct color when projected onto a screen.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. A hot-melt ink for ink jet printers comprising an organic solvent comprising one or more benzoates, said solvent having a melting point less than about 175° C. having a viscosity level less than 30 centpoise at jetting temperatures and further containing a dye.

2. The ink of claim 1 comprising about 75 to 90 wt % pentaerythritol tetrabenzoate.

3. The ink of claim 2 further comprising about 25 to 10 wt % polymethylstyrene.

4. The ink of claim 3 further comprising up to about 2 wt % dye.

5. The ink of claim 4 comprising about 0.25 to 1.25 wt % dye.

6. The ink of claim 2 further comprising about 20-5 wt % sucrose benzoate, and up to 5 wt % glyceryl tribenzoate.

7. The ink of claim 6 further comprising up to about 2 wt % dye

8. The ink of claim 7 comprising about 0.25 to 1.25 wt % dye.

9. A process for hot-melt ink-jet printing comprising jetting an ink comprising a solid organic solvent comprising one or more benzoate derivatives onto a substrate.

10. A transparency for projected viewing comprising a transparent sheet and a printed image formed by hot-melt ink jet printing of an ink comprising an organic solvent comprising one or more benzoate derivatives.

11. A hot-melt ink for ink jet printers comprising an organic solvent comprising one or more benzoates, said solvent having a melting point less than about 175° C. further containing about 25 to 10 wt % polymethylstyrene.

* * * * *